United States Patent [19]

Oishi

[11] Patent Number: 4,760,482
[45] Date of Patent: Jul. 26, 1988

[54] OUTWARDLY TENSIONED MAGNETIC DISC CARTRIDGE

[75] Inventor: Kengo Oishi, Odawara, Japan

[73] Assignee: Fuji Photo Film Co., Ltd., Kanagawa, Japan

[21] Appl. No.: 880,433

[22] Filed: Jun. 30, 1986

[30] Foreign Application Priority Data

Jul. 22, 1985 [JP] Japan .......................... 60-110995[U]

[51] Int. Cl.⁴ ............................................. G11B 23/03
[52] U.S. Cl. ..................................... 360/133; 369/291
[58] Field of Search ............... 360/132, 133; 206/387, 206/444, 312, 313; 369/291; 425/555

[56] References Cited

U.S. PATENT DOCUMENTS 4,428,014 1/1984 Saito ................................. 360/133
4,499,996 2/1985 Coyle ............................... 206/444
4,544,977 10/1985 Ozawa et al. ................... 360/133

FOREIGN PATENT DOCUMENTS 58-45673 3/1983 Japan ................................ 206/387

Primary Examiner—Stuart N. Hecker
Assistant Examiner—Benjamin E. Urcia
Attorney, Agent, or Firm—Sughrue, Mion, Zinn, Macpeak & Seas

[57] ABSTRACT

A disc cartridge made of two molded plastic shells, joined together. Each of the shells have portions of differing molding shrinkage. In an annular embodiment, the outer annulus has the smaller molding shrinkage. In a planar embodiment, the exterior layer has the smaller molding shrinkage. The differing contractions causes the shells to bend outward, away from the enclosed disc.

5 Claims, 2 Drawing Sheets

OUTWARDLY TENSIONED MAGNETIC DISC CARTRIDGE

BACKGROUND OF THE INVENTION

1. Field of the Invention

This invention relates to a magnetic disc cartridge which has a thin disc-shaped magnetic recording medium. Namely, a magnetic disc sheet is enclosed in a case made up of upper and lower shells in such a manner that the magnetic disc sheet is rotatable in the case. More particularly, the invention relates to a magnetic disc cartridge having improved shells.

2. Background Art

A floppy disc is well known in the art which is manufactured by forming magnetic layers on both sides of a disc made of a flexible polyester sheet. The disc is used to record signals on the magnetic layers with the magnetic head while it is being rotated. The floppy disc is advantageous in that it can be readily handled and can be manufactured at low cost. Therefore, the floppy disc is extensively employed as a recording medium for computers.

On the other hand, a micro floppy disc has been put in practical use. The micro floppy disc has been provided by utilizing the advantages of the floppy disc. That is, it offers the advantages of magnetic recording in that the magnetic recording medium, unlike a silver halide film, can be used repeatedly. Also the micro floppy disc is miniaturized and is better than the floppy disc in that it can be more readily handled.

In this case, in order to improve reliability, a hard case is employed as the outside case, and a slidable dustproof shutter is provided for the window of the case which receives the magnetic head. On the other hand, a still camera has been proposed in the art which uses a small floppy disc as its video recording medium. The magnetic disc sheet used by the still camera is small in diameter and has a hub at the center. The magnetic disc sheet is rotatably supported in the small case. Both sides of the case have openings at the center to expose the aforementioned hub and windows to receive the magnetic head. That is, the magnetic disc sheet is used in the form of a magnetic disc cartridge.

The case of the magnetic disc cartridge is formed by combining the upper and lower shells of plastic resin. The shells, being molded with extremely small wall thickness, are liable to be deformed, for instance, being curved inwardly of the case. If the upper and lower shells curve inwardly, the inner walls of the shells are rubbed by the hub, or the line of the resultant crease is strongly pushed against the magnetic disc sheet, thus making the running torque unstable during the rotation of the magnetic disc sheet. Furthermore, if the case is excessively bent, sometimes the magnetic disc sheet or the dustproof shutter is locked. Especially a dual-sided recording type magnetic disc cartridge suffers from a disadvantage that, when the case is inwardly curved, the magnetic disc sheet cannot satisfactorily contact the magnetic head of the magnetic disc recording and reproducing device.

Heretofore, in order to prevent the abovedescribed deformation of the case, the inside of the metal mold has been subjected to so-called "spherical correction" so that the two shells are curved outwardly of the case when molded. However, the spherical correction must be performed with considerably high accuracy, thus greatly increasing the manufacturing cost of the metal mold.

SUMMARY OF THE INVENTION

Accordingly, an object of this invention is to provide a magnetic disc cartridge which is so improved that the shells are prevented from being curved inwardly of the case and that this be accomplished without special machining of the metal mold used to form the cartridge parts.

The foregoing object and other objects of the invention have been achieved by a magnetic disc cartridge having a magnetic disc sheet in a case made up of the upper and lower shells. According to the invention, each of the upper and lower shells has a central case part or inner case part and a peripheral case part or outer case part. The central case part and the peripheral case part or the inner and outer case parts are made of plastic resins which are different from each other in the percentage of molding shrinkage, so that the shells are curved outwardly of the case when molded.

BRIEF DESCRIPTION OF THE DRAWINGS

Embodiments of this invention will be described with reference to the accompanying drawings.

DETAILED DESCRIPTION OF THE PREFERRED EMBODIMENTS

Figure 1:
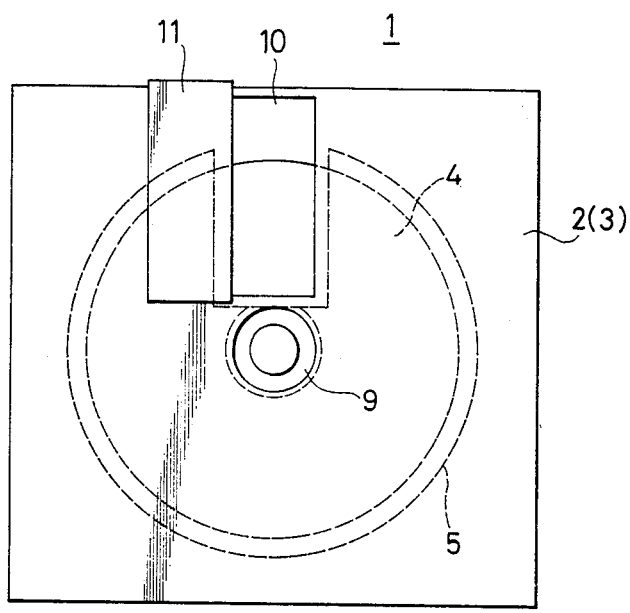
FIG. 1 is a plan view outlining a magnetic disc cartridge which is one embodiment of this invention.

A magnetic disc cartridge 1, as shown in FIG. 1, includes a case made up of similar upper and lower shells 2 and 3 of relatively hard plastic resin. Similarly as in a conventional magnetic disc cartridge, there is placed into the case a magnetic recording medium, namely, a magnetic disc sheet 4 having a metal center core 9 at the center, a liner 5 for protecting and cleaning the sheet, and a lifter (not shown), which is used to push the liner 5 against the sheet 4. Each of the shells 2 and 3 has a rectangular window 10 for receiving the magnetic head. The rectangular window 10 is provided with a dustproof shutter 11 which is slidable to close the window 10 on each side.

Figure 2:
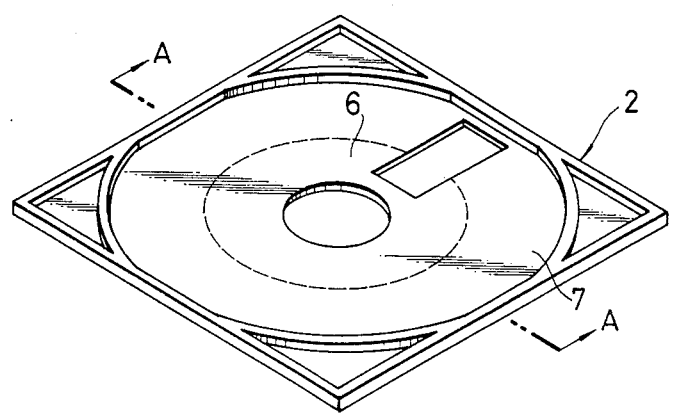
FIG. 2 is a perspective view showing the inside of a shell on the magnetic disc cartridge shown in FIG. 1.
Figure 3:
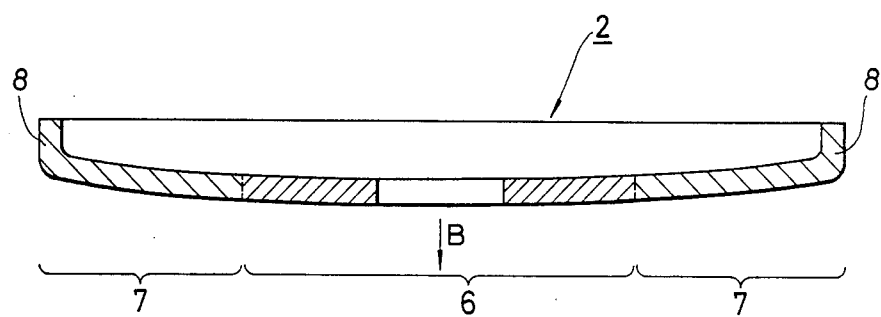
FIG. 3 is a sectional view taken along line A—A in FIG. 2.

The upper shell 2, as shown in FIGS. 2 and 3, has a central circular part 6, inside of the illustrated dotted line (also referred to as a central case part) and an outer central part 7 (also referred to as a peripheral case part). The relative lateral extent of the two circular parts 6 and 7 can be generally as shown in FIG. 3. These circular parts 6 and 7 are made of plastic resins which are different from each other in percentage of shrinkage experienced in molding. That is, the shrinkage percentage of the central case part 6 is smaller than that of the peripheral case part 7. Accordingly, after being molded, the shell 2 is slightly convexly curved in the direction of the arrow B as shown in FIG. 3.

The curve is due to the following reason. After the shell has been formed, the resin is cooled, so that the shell shrinks in its entirety. However, as is apparent from the above description, the peripheral case part 7 shrinks more than the central case part 6, as a result of which the central part 6 is squeezed by the peripheral part 7. At the same time, the force of contraction of the side wall 8 of the shell 2 acts on the shell 2. Thus, the shell 2 is curved in the direction of the arrow B (or outwardly of the case). The lower shell 3 (not shown) which is combined with the upper shell 2 is the same in construction as the upper shell 2.

The material of the shell 2 is primarily acrylonitrile-butadiene styrene (ABS) resin. The material of the central part 6 of the shell 2 is mixed with filler such as carbon or glass. The material of the peripheral part 7 may be mixed with filler. However, it should be noted that the quantity of filler mixed in the material of the peripheral part 7 is smaller than that of filler mixed in the material of the central part 6.

The shell 2 can be readily manufactured, for instance, by dichroic molding.

The content of filler mentioned above is not particularly limited. That is, it can be determined according to various conditions such as ratio of the areas of the two circular parts 6 and 7, the shell thickness, the plastic resin used, and the quality of the filler employed.

The shells 2 and 3 are generally colored as required. Therefore, the molding shrinkage percentage can be controlled by adjusting the quantity of pigment for coloring the plastic resin.

In each of the shells 2 and 3 thus constructed, the side wall 8 and peripheral ribs, illustrated in FIG. 2, are joined or bonded together, for instance, by ultrasonic welding. When the case is assembled, the upper and lower shells 2 and 3 are so forced together that their outward expansion is suppressed but they remain outwardly convex. That is, a force of expanding the upper and lower shells 2 and 3 outward of the case acts at all times on the walls 6 and 7 of the upper and lower shells 2 and 3 at all times which confront with the magnetic disc sheet 4. Therefore, the walls 6 and 7 of the upper and lower shells 2 and 3 will never be curved inwardly of the case. That is, the walls are resistive, to some extent, against an external force which would act to curve the walls inwardly of the case.

Accordingly, the upper and lower shells 2 and 3 will never be rubbed by the center core 9. That is, the magnetic disc cartridge of the invention is free from the difficulties that the upper and lower shells 2 and 3 are rubbed by the center core to form a resinous powder nor does the rubbing of the center core adversely affect the rotation of the sheet 4. The magnetic disc sheet 4 can be suitably spaced part from the upper and lower shells 2 and 3.

In the above-described embodiment, both of the upper and lower shells are curved outwardly of the case. However, the same effect can be obtained by curving only one of the two shells outwardly of the case.

In the above-described embodiment, the central case part 6 and the peripheral case part 7 form a structure of layers arranged side by side along the magnetic disc sheet 4. However, the invention is not limited thereby or thereto. For instance, the shell may be formed as shown in FIG. 4.

Figure 4:
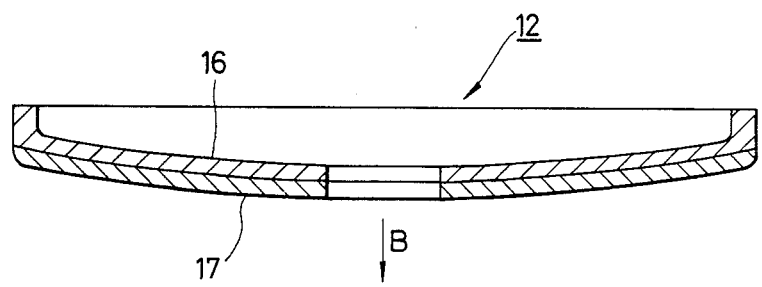
FIG. 4 is a sectional view of another embodiment of the invention.

FIG. 4 is a sectional view of one of the shells which form a magnetic disc cartridge case. In a shell 12 shown in FIG. 4, two parts different in molding shrinkage percentage from each other, namely, an inner case part 16 and an outer case part 17, form a structure of layers arranged in the direction of thickness of the case. In molding, the shrinkage percentage of the inner case part 16 is larger than that of the outer case part 17. Similarly as in the above-described embodiment, the shrinkage percentage can be controlled by adjusting the content of filler such as carbon or glass in a plastic resin such as ABS resin.

The shell 12 thus constructed, after being taken out of the metal mold, is slightly curved in the direction of the arrow B (or outwardly of the case).

In the above-described two embodiments, the shrinkage percentage is controlled by adjusting the content of filler mixed in the plastic resin. However, the invention is not limited thereto or thereby. For instance, plastic resins such as ABS resin and PS resin which are compatible with each other but different in molding shrinkage percentage from each other may be employed.

As was described above for the magnetic disc cartridge of the invention, each of the shells is so designed that the molding shrinkage percentage of the central case part 6 (or the inner case part 16) is different from that of the peripheral case part 7 (or the outer case part 17), whereby the shell is curved outwardly of the case. Therefore, the magnetic disc cartridge of the invention is free from the difficultly that the inner walls of the shells are rubbed by the center core 9 of the magnetic disc sheet 4 to form resinous powder or adversely affect the rotation of the magnetic disc sheet 4. When the magnetic disc cartridge is assembled, the shells 2 and 3 (or 12) are forcibly suppressed in outward expansion when compared with those which has been just molded. Thus, the walls of the shells which confront with the sheet 4 tend to curve outwardly of the case so that the shells are maintained tight at all times. Accordingly, the rigidity of the shells is substantially increased to prevent the deformation of the case, which, for instance, can prevent the difficulty that the dustproof shutter 11 becomes unslidable.

Thus, in the magnetic disc cartridge according to the invention, the shell shape positively prevents deformation of the shell and sufficiently protects the enclosed recording medium without the necessity of machining the metal mold which has been done for conventional magnetic disc cartridges.

What is claimed is:

1. A disc cartridge for accommodating a recording disc, comprising:
   an upper shell; and
   a lower shell displaced along an axis from said upper shell and attached at a periphery to said upper shell, both said shells having a substantially planar surface being formed of molded plastic resin at opposing axial sides of said attached shells;
   wherein at least one of said shells is molded and has a plurality of regions differing between said regions in percentage of molding shrinkage during cooling from a molding temperature to an ambient temperature, said differing percentage of molding shrinkage producing bending of a central portion of said planar surface of said one shell radially interior to said periphery, said bending being axially outwardly of a central plane of said cartridge such that said central portion is further from said central plane than regions adjacent said periphery.

2. A disc cartridge as recited in claim 1, wherein said plurality of regions comprises a radially inner circular portion and a radially outer circular portion of said surface closer to said periphery than said inner circular portion, said inner circular portion having a smaller percentage of molding shrinkage than said outer circular portion.

3. A disc cartridge as recited in claim 1, wherein said plurality of regions are layers axially arranged in a direction extending from said upper shell to said lower shell, a first of said layers interior to said cartridge having a larger percentage of molding shrinkage than a second of said layers axially exterior to said cartridge.

4. A disc cartridge for accommodating a disc, comprising two shells displaced from each other along an axis and bonded at radially peripheral mating surfaces thereof, each said shell comprising:
- a substantially planar radially inner annular region of a molded plastic resin; and
- a substantially planar radially outer annular region, radially outward of and closer to said peripheral mating surfaces than said inner annular region, integrally formed with a perpendicular side wall with one of said mating surfaces being at an edge of said side wall away from said outer annular region, said outer region being of a molded plastic resin having a larger percentage of molding shrinkage than said inner region;
- wherein said inner and outer regions are curved axially outwardly from said mating surfaces as a result of the different molding shrinkage percentages between said regions during cooling from a molding temperature to an ambient temperature, whereby respective inner regions of each shell are axially further from each other than respective outer regions.

5. A disc cartridge for accommodating a disc, comprising two shells displaced from each other along an axis and bonded at radially peripheral mating surfaces thereof, each said shell comprising;
- an axially inner substantially planar annular layer integrally formed with a perpendicular sidewall with one of said mating surfaces being at an edge of said sidewall away from said inner annular layer; and
- an axially outer substantially planar annular layer disposed on said first annular layer axially exterior to a center of said cartridge;
- wherein said inner and outer layers are formed of molded plastic resin and a percentage of molding shrinkage of said inner layer is greater than that of said outer layer, the percentage difference causing said inner and outer layers to bend axially away from said mating surfaces during cooling from a molding temperature to an ambient temperature, whereby radially inner portions of respective shells are further from each other than radially outer portions.

* * * * *